United States Patent [19]

Halasa et al.

[11] 4,225,690

[45] Sep. 30, 1980

[54] PROCESS AND CATALYST FOR PRODUCING HIGH TRANS 1,4-POLYBUTADIENE

[75] Inventors: Adel F. Halasa, Bath; James E. Hall, Akron, both of Ohio

[73] Assignee: The Firestone Tire & Rubber Company, Akron, Ohio

[21] Appl. No.: 960,514

[22] Filed: Nov. 13, 1978

[51] Int. Cl. .................................................. C08f 4/54
[52] U.S. Cl. .................................. 526/183; 526/181
[58] Field of Search ................................. 526/183

[56] References Cited

U.S. PATENT DOCUMENTS

| | | | |
|---|---|---|---|
| 3,294,768 | 12/1966 | Wofford | 526/174 |
| 3,629,213 | 12/1971 | Onishi et al. | 526/173 |
| 3,846,385 | 11/1974 | Havgir et al. | 526/183 |

Primary Examiner—William F. Hamrock

[57] ABSTRACT

The process disclosed herein comprises the use of a catalyst system comprising a complex of $R_2Mg \cdot (ROK)_2$ in the hydrocarbon solution polymerization of 1,3-butadiene. Preferably the solvent is hexane, but cyclohexane or other alkane or cycloalkane may be used. The ratio of ROK to $R_2Mg$ is from 1.0/1 to 5/1 and the $R_2Mg$ and ROK are added separately to the butadiene solution. This process produces a high trans 1,4-polybutadiene which is particularly suitable as a coating for metals such as the coating of steel for beverage cans.

22 Claims, No Drawings

PROCESS AND CATALYST FOR PRODUCING HIGH TRANS 1,4-POLYBUTADIENE

BACKGROUND OF THE INVENTION

1. Field of the Invention

This invention relates to a process for the production of high trans 1,4-polybutadiene. More specifically it relates to a polymerization system using a catalyst comprising a complex of $R_2Mg$.

2. Related Prior Art

The most pertinent reference found with regard to catalyst systems comprising complexes of $R_2Mg$ and ROK is U.S. Pat. No. 3,822,219. This patent is directed primarily to catalytic complexes of dibutyl magnesium with butyl lithium and butyl potassium for the polymerization of olefins, including butadiene, particularly in the presence of a telomerizing agent, such as toluene, to produce low molecular weight polymers or telomers. While most of the discussion and the working examples are directed to the preparation of $R_2Mg\cdot RLi$ catalyst complexes and their use in preparing telomers, Example XVII (Col. 14) describes the preparation of a complex having the formula $(n\text{-}C_4H_9K)\cdot(N\text{-}C_4H_9MgO\text{-}tert\text{-}C_4H_9)$. This is prepared by reacting 10 moles of potassium tert-butoxide per mole of di-n-butylmagnesium for 5 minutes before butadiene is added.

Either the large excess of t-BuOK or the aging period causes partial replacement of the n-$C_4H_9$ from the dibutylmagnesium to give the mixed compound n-$C_4H_9MgO$-t-$C_4H_9$ which becomes complexed with the liberated n-$C_4H_9K$. As patentee comments in lines 36–49, this system produces low molecular weight telomers. Furthermore, while the patent is directed mainly to n-BuLi complexes, the maximum trans content shown for the polymer products is the 45% shown in Col. 13, line 16.

SUMMARY OF THE INVENTION

In accordance with the present invention, it has been found that a complex may be formed by using proportions of 1.0–5, preferably 1.2–4 moles of ROK per mole of $R_2Mg$ which will catalyze the polymerization of butadiene to give 80% or more of trans-1,4 polybutadiene. The $R_2Mg$ is advantageously used in a proportion of 0.1–20 millimoles, preferably 0.1–1 millimole per hundred grams of butadiene. It is also helpful to avoid prereaction by mixing the catalyst components in the presence of the butadiene.

It is believed that the complex of this invention has the formula $R_2Mg\cdot(ROK)_2$. Therefore, while as low a ratio as 1.0/1 of the ROK to the $R_2Mg$ will form enough of this complex to activate the polymerization, it is preferable to use at least 2 moles of ROK per mole of $R_2Mg$. Moreover while it is preferred to use no more than about 4 moles of ROK per mole of $R_2Mg$, it is possible to use 5 or more moles of ROK provided conditions are such as to avoid displacement of R with ROK in the magnesium compound as shown in the patent. This is best accomplished by not allowing any prereaction and to mix the complex components in the presence of the butadiene where the polymerization will be effected before any of the undesired displacement reaction may be effected. However most of the excess is wasted since there is no need to use more than 2 moles of ROK per mole of $R_2Mg$.

In the above formula R is a hydrocarbyl radical of 1–20 carbon atoms, advantageously an alkyl radical of 1–20, preferably 3–6 carbon atoms, but may also be cycloakyl or aryl of 6–20, preferably 6–12 carbon atoms. In preferred ROK compounds, R is t-butyl, t-amyl or t-hexyl, whereas preferred $R_2Mg$ compounds are di-n-butyl, n-butyl-sec-butyl and di-sec-butyl magnesium. Other typical R groups include, but are not restricted to ethyl, n-propyl, isopropyl, n-amyl, sec-amyl, sec-hexyl, n-hexyl, octyl, nonyl, decyl, dodecyl, octadecyl, phenyl, tolyl, dimethylphenyl, ethylphenyl, naphthyl, cyclohexyl, methylcyclohexyl, ethylcyclohexyl, cycloheptyl, etc.

In the catalyst system and polymerization of this invention it is necessary to take the standard precautions against contamination of an organometallic system with impurities such as water, air, etc. which will deactivate or reduce the efficiency of the system. Consequently the solvent, reagents, reactor and atmosphere in the reactor are treated accordingly to avoid such contaminants. Advantageously there is less than 25 ppm, preferably less than 5 ppm, of water present.

The polymerization is advantageously conducted in a solvent. Hexane is preferred as well as other alkanes, advantageously of 3–20 carbon atoms, preferably 5–10 carbon atoms, such as butane, pentane, heptane, octane, decane, etc. However, other nonaromatic hydrocarbon solvents such as cycloalkanes, e.g., cyclohexane, methylcyclohexane, cycloheptane, etc. may also be used. These cycloalkanes advantageously have 6–20, preferably 6–10 carbon atoms. Toluene and other aromatics act as telomerizing agents and thereby reduce the average molecular weight of the product and in many cases may actually prevent polymerization. Advantageously a butadiene concentration of 5–36% is desirable, preferably about 20–25%.

A broad temperature range may be used in the polymerization to give yields of 80% or more although higher temperatures give a reduced amount of trans configuration in the product. With temperatures in the range of −30 to +50° C. yields of 90% or more are obtained with the products having 80–98% trans-1,4 configuration. Temperatures of about 0–10° C. are preferred which give 90% yield or more and 90% or more of trans-1,4 configuration, together with suitable reaction rate.

When polymerization is completed, the catalyst is deactivated by the addition of a small amount of alcohol or acid, calculated on the amount of catalyst present. Then the polymer product is recovered by dumping the reaction mass in a large volume of isopropanol or other low molecular weight alcohol, preferably one containing a small amount, such as 1%, of an antioxidant, such as di-t-butyl cresol. The precipitated polymer is recovered and dried before processing.

For use in coating tinplate or steel the polymer is advantageously applied to the metal as an emulsion. Then the coating is dried in an oven and the polymer fused and cured by heating to elevated temperature.

The polymerizations are conducted in autoclaves, pressurized reactors or bottles capable of withstanding the pressures generated at the temperature used.

While a substantial amount of polymerization is effected within 30 minutes, it is generally preferred to proceed for one hour to three hours. Moreover, while polymerization is generally substantially completed within three hours, there is no harm or adverse result in allowing polymerization to continue 70 hours or more.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

In the working examples described below the experiments are performed in 28 ounce bottles capped with a rubber septum through which various additions can be made by hypodermic needle. The bottles are cleaned and dried before use and swept out with nitrogen prior to addition of reagents and a nitrogen atmosphere maintained during polymerization. The premixing and prereaction of catalyst components are performed in a 10 ounce similarly cleaned bottle and 100 ml. of toluene added before the catalyst components are added. In Examples I and II, the butadiene is used as a blend of 9% 1,3-butadiene in toluene. In Examples III–V, blends of 21.7–24.6% butadiene in hexane are used.

EXAMPLE I

In this example an attempt is made to duplicate most of the conditions of Example XVII of the above-mentioned Pat. No. 3,822,219 which used a 10/1 ratio of K/Mg in preparing a premixed catalyst and using toluene as solvent for the polymerization, with the reagents, proportions and conditions reported in the table below. n-Butyl-isobutyl magnesium is used as the $R_2Mg$ compound since it is available commercially and K-O-t-Am represents potassium amylate. The mixture of $R_2Mg$ and K-O-t-Am in toluene is allowed to coreact 5–10 minutes before adding the TMEDA (tetramethylenediamine) and then adding to the butadiene. The butadiene is used as 9% blend in toluene, which blend is purified prior to use by passing through a 3A molecular sieve. In Runs 1, 2 and 3, there is no polymerization evident and therefore, an additional 0.25 millimoles of $R_2Mg$ is added which initiates the reaction. However since this additional amount is not prereacted with the K-O-t-Am, Runs 4, 5 and 6 are performed in which all of the $R_2Mg$ is premixed with the KO-t-Am thus changing the K/Mg ratio from 10/1 to 6.09/1. As will be observed from the table, the only experiments which produce polymer under these conditions are Runs 2 and 3 in which the unmixed $R_2Mg$ is added. Apparently the absence of TMEDA is the reason for Run 1 not producing polymer. As will be noted in Runs 2 and 3, toluene is identified by Infrared which confirms its action as a telomerizing agent.

The molecular weight of the polymer product is governed by the amount of catalyst used per unit or molecule of monomer. This may be calculated on the amount of $R_2Mg$ used, in a manner similar to calculating theoretical molecular weights when other anionic catalysts are used. Taken into consideration is the fact that the Mg is divalent and therefore initiates two polymer molecules. Generally molecular weights of 10,000–1,000,000 are conveniently prepared, preferably 100,000–500,000.

TABLE I

| | Catalyst Components Premixed Except Additions Made to Runs 1-3 | | | | | | |
|---|---|---|---|---|---|---|---|
| Run No. | 1 | 2 | 3 | 4 | 5 | 6 | 7 |
| $R_2Mg$ | 0.39* | 0.39* | 0.39* | 0.64 | 0.64 | 0.64 | 1.00 |
| KO-t-Am(mM) | 3.9 | 3.9 | 3.9 | 3.9 | 3.9 | 3.9 | 2.00 |
| K/Mg ratio | 10/1** | 10/1** | 10/1** | 6.09/1 | 6.09/1 | 6.09/1 | 2/1 |
| TMEDA (mM) | 0 | 0.23 | 0.23 | 0 | 0.25 | 0.25 | 0 |
| Toluene (gm) | 330.3 | 330.3 | 321.2 | 325 | 324 | 324 | 324 |
| Butadiene (gm) | 32.7 | 32.7 | 31.8 | 32 | 32 | 32 | 32 |
| Temp °C. | 50 | 50 | 50 | 50 | 50 | 50 | 5 |
| Reac. Time (hrs) | 16 | 16 | 16 | 16 | 16 | 16 | 16 |
| Yield (gms) | 0 | 3 | 33 | 0 | 0 | 0 | 0 |
| IR: | | | | | | | |
| Cis-1,4 | | 22.5 | 23.5 | | | | |
| Trans-1,4 | | 33.0 | 35.3 | | | | |
| 1,2- | | 32.0 | 29.2 | | | | |
| Toluene | | 7.5 | 12.0 | | | | |

*Premixed catalyst did not initiate reaction within 2 hours, so an additional 0.25 millimoles of $R_2Mg$ was added. Resulting catalyst composition was therefore partially premixed and partially added in situ.
**Ratio of premixed plus in situ addition changes to 6.09/1.

EXAMPLE II

In a series of experiments as reported below in Table II similar conditions are used as in Example I except that the catalyst components are not premixed but are added sequentially to the butadiene solution and the reaction time is extended to 64 hours. In Run 1 where a temperature of 5° C. is used instead of the 50° C. in the other runs, a very low yield is obtained which is partly soluble and partly insoluble in the toluene. All the other runs produce a liquid polymer which is probably similar to the telomer produced in the above-mentioned U.S. Pat. No. 3,822,219. Moreover, none of the products have a major portion of trans-1,4 structure. Again, the presence of toluene in the polymer structure confirms its action as a telomerizing agent.

TABLE II

| | Catalyst Components Not Premixed But Added Sequentially to Butadiene Solution | | | |
|---|---|---|---|---|
| Run No.: | 1 | 2 | 3 | 4 |
| Toluene (gms) | 320.3 | 324.9 | 334.9 | 333.1 |
| Butadiene (gms) | 31.7 | 32.1 | 33.1 | 32.9 |
| $R_2Mg$ (mM) | 1.5 | 1.5 | 1.5 | 1.5 |
| KO-t-Am (MM) | 10.2 | 10.2 | 10.2 | 10.2 |
| K/Mg ratio | 6.8/1 | 6.8/1 | 6.8/1 | 6.8/1 |
| TMEDA (mM) | 0 | 0 | 3.0 | 3.0 |
| Temp (°C.) | 5 | 50 | 50 | 50 |
| Time Hrs.* | 64 | 64 | 64 | 64 |
| Yield (gms) | 5.5** | 42*-1 | 42*-1 | 42*-1 |
| IR: | | | | |
| Cis-1,4 | 35.5 (12.2)*** | 29.3 | 27.9 | 29.0 |
| trans-1,4 | 39.7 (39.3) | 24.4 | 25.7 | 24.3 |
| 1,2 | 22.3 (38.7) | 12.4 | 18.0 | 13.8 |

TABLE II-continued

| Catalyst Components Not Premixed But Added Sequentially to Butadiene Solution | | | | |
|---|---|---|---|---|
| Run No.: | 1 | 2 | 3 | 4 |
| toluene | 2.4 (9.7) | 33.9 | 28.4 | 32.9 |

*Left in bath over weekend
**3.5 gms soluble and 2 gms insoluble
***Soluble portion (insoluble portion)
*-1 Soluble liquid product

EXAMPLE III

A series of experiments is performed using hexane as the solvent in place of the toluene varying the K/Mg ratio from 10/1 to 2/1 and prereacting catalyst components in hexane in some cases and adding them separately to the butadiene in other cases. Also, in each experiment the reaction temperature is 5° C. instead of 50° C. The reagents, amounts and conditions as well as the results are reported below in Table III. As will be noted, the prereaction of the catalyst components in Runs 1 and 3 has undesirable results and the 10/1 ratio in Run 3 produces only 33.9% trans-1,4 as compared to the 82.5% trans-1,4 produced by the 2/1 ratio in Run 4.

TABLE III

| | Catalyst Components Prereacted | | Catalyst Components Added Individually to Bd Blend | |
|---|---|---|---|---|
| Run No. | 1 | 3 | 2 | 4 |
| R$_2$Mg(mM) | 0.234 | 0.28 | 0.25 | 0.28 |
| K-t-Am(mM) | 2.34 | 0.56 | 2.5 | 0.56 |
| K/Mg ratio | 10/1 | 2/1 | 10/1 | 2/1 |
| Hexane (gm) | 210 | 211.1 | 212 | 196 |
| Butadiene (gm) | 42 | 68.9 | 43 | 64 |
| Temp. (°C.) | 5° | 5° | 5° | 5° |
| Reaction time (hrs) | 18 | 18 | 18 | 18 |
| Yield (%) | trace | 16.4 | 0.5 | 50 |
| IR: | | | | |
| Cis-1,4 | — | 10.9 | 10.5 | 1.3 |
| trans-1,4 | — | 33.4 | 33.9 | 82.5 |
| 1,2 | — | 55.7 | 55.6 | 16.2 |

EXAMPLE IV

A number of experiments are performed as in Example III using a blend of 21.7% butadiene in hexane purified through silica gel, a reaction temperature of 30° C. and in some experiments, varying the K/Mg ratios with the Mg concentrations substantially constant, and in other experiments, varying the Mg concentration with variations in the K/Mg ratios. The results are reported below in Tables IVa and IV b. The rate constant is calculated by the equation $k = 1/t \times \log_n \times C_o/C$, where t is reaction time, $\log_n$ is the natural logarithm, $C_o$ is the original concentration and C is the concentration at the end of t.

TABLE IVa

| | In order of ascending K/Mg ratios for somewhat similar mM Mg phgm | | | |
|---|---|---|---|---|
| Run No. | 73 | 61 | 74 | 75 |
| Mg(mM/phgm) | 0.78 | 0.79 | 0.75 | 0.76 |
| K/Mg ratio | 1.24 | 1.56 | 1.87 | 3.11 |
| Time (hrs.) | 3 | 3.6 | 3 | 3 |
| Conversion | 33.5% | 84.5% | 86.4% | 91.4% |
| % trans-1,4 | 90.4 | 90.1 | 93.8 | 91.8 |
| Rate Constant | 2.8 | 9.1 | 10.1 | 12.6 |

TABLE IVa-continued

| | In order of ascending K/Mg ratios for somewhat similar mM Mg phgm | | | |
|---|---|---|---|---|
| Run No. | 73 | 61 | 74 | 75 |
| (k × 10$^3$) | | | | |

TABLE IVb

| | In order of ascending K/Mg ratios for somewhat similar mM Mg phgm | | |
|---|---|---|---|
| Run No. | 62 | 61 | 63 |
| Mg(mM/phgm) | 0.39 | 0.79 | 1.14 |
| K/Mg ratio | 1.55 | 1.46 | 1.54 |
| Time (hrs) | 6 | 3.6 | 2.8 |
| Conversion | 61.6% | 84.5% | 93.3% |
| % trans-1,4 | — | 90.1 | 89.5 |
| Rate Constant (k × 10$^3$) | 2.7 | 9.1 | 14.9 |

EXAMPLE V

A series of experiments is performed similar to Example III using a blend containing 24.6% butadiene in hexane which has been purified by passing through silica gel. The amounts of reagents and other conditions are as reported below in Table V. In each case except Run 2, the catalyst components are premixed and aged for one day before adding to the butadiene blend. Apparently, because of the prereaction of catalyst components in Runs 1, 3 and 4 and because of the high K/Mg ratio in Run 2, these experiments all give minor amounts of trans-1,4 configuration.

TABLE V

| Run No: | 1 | 2* | 3 | 4 |
|---|---|---|---|---|
| Mg (mM/phgm) | 0.46 | 0.46 | 0.47 | 0.47 |
| K/Mg ratio | 10/1 | 10/1 | 2/1 | 2/1 |
| Time (hrs) | 16 | 16 | 16 | 16 |
| Temperature (°C.) | 5 | 5 | 5 | 30 |
| Yield (gms.) | 1 | 1 | 18 | 56 |
| IR: | | | | |
| cis-1,4 | 20.1 | 26.9 | 12.3 | 17.4 |
| trans-1,4 | 28.1 | 22.3 | 32.3 | 32.0 |
| 1,2 | 51.8 | 50.8 | 55.4 | 50.6 |

*Catalyst components added separately and not premixed.
All other premixed and aged one day.

EXAMPLE VI

The procedure of Example III is repeated a number of times with the following R$_2$Mg compounds using a blend of 24% butadiene in hexane; a K/Mg ratio of 2/1; Mg proportion of 0.8 millimoles per hundred grams of butadiene; temperature of 5° C. and reaction time of 3 hours. In each case yields of over 80% and products of over 80% trans-1,4 polybutadiene are obtained.
 (a) Di-n-butyl magnesium
 (b) Di-n-amyl magnesium
 (c) n-Butyl-sec-amyl magnesium
 (d) Di-sec-butyl magnesium
 (e) Di-n-hexyl magnesium

EXAMPLE VII

The procedure of Example VI is repeated a number of times using n-butyl-sec-butyl magnesium and the following ROK compounds respectively. In each case results similar to those of Example VI are obtained.
 (a) Potassium tert-butoxide
 (b) Potassium tert-hexoxide
 (c) Potassium isopropoxide (d) Potassium sec-amyloxide
(e) Potassium sec-hexoxide

EXAMPLE VIII

The procedure of Example VI is repeated a number of times with results similar to those of Example VI, using n-butyl-sec-butyl magnesium and K-O-t-Am with a 24% butadiene blend except that the following solvents are used individually in place of the hexane.

(a) Heptane
(b) Octane
(c) Cyclohexane
(d) Pentane

The products from Run 4 of Example III and from the four runs of Example IV give satisfactory results when applied as a coating to tinplate and to non-tinned steel plate.

EXAMPLE IX

A series of experiments are conducted duplicating the procedure of Example III-4 under conditions as identical as possible except with the variations noted in Table IX to determine the progress of polymerization over increasing periods of time. In each case, a blend of 21.68% butadiene in hexane is used and 0.273 millimole (mM) of n-butyl-sec-butyl-magnesium, 0.510 millimole of K-O-t-Am, a K/Mg ratio of 1.87 and reaction temperature of 27° C. are used.

TABLE IX

|  | 1 | 2 | 3 | 4 | 5 | 6 | 7 |
|---|---|---|---|---|---|---|---|
| Butadiene (gms) | 37.4 | 36.3 | 36.5 | 36.5 | 36.0 | 36.3 | 35.6 |
| Mg (mM/hgm) | 0.730 | 0.752 | 0.748 | 0.748 | 0.758 | 0.752 | 0.767 |
| Time (mins.) | 15 | 30 | 45 | 60 | 90 | 120 | 180 |
| Conversion (%) | 8.69 | 24.79 | 36.3 | 40.41 | 62.5 | 71.6 | 86.4 |
| IR: |  |  |  |  |  |  |  |
| Cis-1,4 | — | — | 0 | — | — | — | 0 |
| Trans-1,4 | — | — | 90.7 | — | — | — | 97.0 |
| 1,2- | — | — | 9.3 | — | — | — | 2.9 |
| $M_n$ (GPC) | — | — | 23,270 | — | — | — | — |
| $M_w/M_n$ | — | — | 3.328 | — | — | — | — |

For Run 3, the 36.3% conversion calculates to a $M_n$ of 48,500 (36.3 gm/0.748 mM/hgm) if only one organic radical on the $R_2Mg$ is active; and if the two organic radicals are both active the $M_n$ calculates to 24,250. Since the GPC molecular weight is measured at 23,270, this indicates that both of the organic radicals of the $R_2Mg$ are active in the polymerization.

EXAMPLE X

The procedure of Example IX is repeated with the conditions and results shown below in Table X, using in each run a blend of 21.68% butadiene in hexane and 0.273 millimole of n-butyl-sec-butyl-magnesium, 0.850 mM of K-O-t-Am, a K/Mg ratio of 3.11 and reaction temperature of 27.5° C.

TABLE X

|  | 1 | 2 | 3 | 4 | 5 | 6 | 7 |
|---|---|---|---|---|---|---|---|
| Butadiene (gms) | 36.46 | 35.59 | 36.02 | 30.56 | 36.02 | 35.80 | 36.13 |
| Mg(mM/hgm) | 0.749 | 0.767 | 0.758 | 0.747 | 0.758 | 0.763 | 0.756 |
| Time (mins.) | 15 | 30 | 45 | 60 | 90 | 120 | 180 |
| Conversion | 5.49 | 31.61 | 44.42 | 49.23 | 67.32 | 89.38 | 91.39 |
| IR: |  |  |  |  |  |  |  |
| Cis-1,4 | — | 0 | — | — | — | — | 0 |
| Trans-1,4 | — | 93.1 | — | — | — | — | 90.5 |
| 1,2- | — | 6.9 | — | — | — | — | 9.5 |
| $M_n$ | — | 18,400 | — | — | — | — | 47,900 |

The molecular weights of 18,400 and 47,900 compare with calculated molecular weights of 20,600 and 60,400 to indicate that both of the R groups in the $R_2Mg$ are active as compared to the calculated $M_n$ of 41,200 and 120,800, respectively, if only one R group was active.

While certain features of this invention have been described in detail with respect to various embodiments thereof, it will of course be apparent that other modifications can be made within the spirit and scope of this invention, and it is not intended to limit the invention to the exact details shown except insofar as they are defined in the following claims.

The invention claimed is:

1. The process of polymerizing butadiene to a polymer having at least 80 percent trans-1,4 configuration comprising the addition of ROK and $R_2Mg$ to butadiene dissolved in an aliphatic or cycloaliphatic hydrocarbon wherein R represents a hydrocarbyl radical of 1–20 carbon atoms; said $R_2Mg$ being added in a proportion of 0.1–20 millimoles per one hundred grams of butadiene, said ROK being added in a proportion to give a K/Mg ratio in the range of 1.0/1 to 5/1; a temperature of −30° C. to 30° C. being maintained during said polymerization; and said polymerization being effected for a period of at least 30 minutes.

2. The process of claim 1 in which R represents an alkyl radical of 3–6 carbon atoms.

3. The process of claim 1 in which the R in said ROK is an alkyl radical of 3–6 carbon atoms.

4. The process of claim 3 in which said R represents an amyl radical.

5. The process of claim 4 in which said R represents the tertiary-amyl radical.

6. The process of claim 1 in which the two R radicals in each said $R_2Mg$ represents an alkyl radical of 3–6 carbon atoms.

7. The process of claim 6 in which said R radicals are butyl radicals.

8. The process of claim 6 in which said R radicals are n-butyl radicals.

9. The process of claim 6 in which said R radicals are sec-butyl radicals.

10. The process of claim 1 in which said $R_2Mg$ is n-butyl-sec-butyl magnesium.

11. The process of claim 1 in which said hydrocarbon is an aliphatic hydrocarbon.

12. The process of claim 11 in which said hydrocarbon is an aliphatic hydrocarbon of 5–10 carbon atoms.

13. The process of claim 11 in which said hydrocarbon is hexane.

14. The process of claim 11 in which said hydrocarbon is heptane.

15. The process of claim 1 in which said hydrocarbon is cyclohexane.

16. The process of claim 12 in which said K/Mg ratio is in the range of 1.2/1 to 4/1.

17. The process of claim 16 in which said temperature is 0–30° C.

18. The process of claim 17 in which the R groups in said $R_2Mg$ are alkyl groups of 3–6 carbon atoms.

19. The process of claim 17 in which both R groups in said $R_2Mg$ are butyl groups selected from the class consisting of n-butyl and sec-butyl groups.

20. The process of claim 19 in which the R in said ROK is an alkyl group of 3–6 carbon atoms.

21. The process of claim 19 in which ROK is K-O-t-amylate.

22. The process of claim 21 in which the K/Mg ratio is approximately 2.

* * * * *